United States Patent [19]
Sakamoto et al.

[11] Patent Number: 5,762,697
[45] Date of Patent: Jun. 9, 1998

[54] COATING SOLUTION FOR SILICA-BASED COATING FILM AND METHOD FOR THE PREPARATION THEREOF

[75] Inventors: Yoshinori Sakamoto, Kawasaki; Yoshio Hagiwara, Tokyo-to; Toshimasa Nakayama, Chigasaki, all of Japan

[73] Assignee: Tokyo Ohka Kogyo Co., Ltd., Japan

[21] Appl. No.: 749,845

[22] Filed: Nov. 15, 1996

[30] Foreign Application Priority Data

Nov. 16, 1995 [JP] Japan .................. 7-298736

[51] Int. Cl.$^6$ ............................ C09D 183/06
[52] U.S. Cl. ........................... 106/287.16
[58] Field of Search ..................... 106/287.16

[56] References Cited

U.S. PATENT DOCUMENTS 5,446,088  8/1995  Haluska ..................... 524/588
5,496,402  3/1996  Sakamoto et al. ............. 106/287.1

FOREIGN PATENT DOCUMENTS 0 443 760  8/1991  European Pat. Off. ........ C08G 77/12

*Primary Examiner*—David Brunsman
*Attorney, Agent, or Firm*—Wenderoth, Lind & Ponack

[57] ABSTRACT

Proposed is a coating solution for the formation of a silica-based coating film on the surface of a substrate used in the manufacturing process of semiconductor devices as well as a method for the coating solution, which exhibits excellent storage stability without gelation and is capable of forming a silica-based coating film free from the troubles due to evolution of gases such as crack formation even when the coating film has a relatively large thickness. The coating solution is prepared by the hydrolysis reaction of a trialkoxy silane such as triethoxy silane dissolved in propyleneglycol dimethyl ether in a specified concentration with addition of a specified amount of water followed by removal of the alcohol formed by the hydrolysis reaction of the trialkoxy silane by distillation to such an extent that the content of the alcohol in the coating solution does not exceed 10% by weight or, preferably, 3% by weight.

7 Claims, 3 Drawing Sheets

COATING SOLUTION FOR SILICA-BASED COATING FILM AND METHOD FOR THE PREPARATION THEREOF

BACKGROUND OF THE INVENTION

The present invention relates to a novel coating solution for the formation of a silica-based coating film on a substrate surface used in the manufacturing process of semiconductor devices for the purpose of obtaining a flat and even surface on a substrate having a non-even or stepped surface as a planarizing or leveling pretreatment for the fine photolithographic patterning work as well as to a method for the preparation of the coating solution.

As is well known in the manufacturing process of certain semiconductor devices such as VLSIs and the like involving the technique of photolithographic patterning, it is a requirement in recent years to develop a technology for accomplishing a more and more increased fineness of patterning in order to comply with the demand for a semiconductor device of a high degree of integration capable of working at an increased velocity and exhibiting a multiplicity of functions. The manufacturing process of semiconductor devices, for example, almost always involves a photolithographic patterning on the surface of a substrate such as a semiconductor silicon wafer for the formation of a circuit pattern or a patterned insulating layer. When the underlying substrate surface is not flat and even but has a stepwise level difference, needless to say, accurate patterning can hardly be accomplished. Accordingly, it is a pretreatment of the photolithographic patterning conventionally undertaken that such a stepped substrate surface is coated with a coating solution, referred to as a leveling solution hereinafter, so as to form a coating layer having a flat and even surface.

One of the conventional and most practical leveling solutions used for such a purpose of surface leveling is a solution prepared by dissolving an alkoxy silane compound in a solvent mainly composed of an alcohol to effect the hydrolysis of the alkoxy silane compound with water in the presence of an acidic hydrolysis catalyst. The method for eliminating the stepped level difference on a substrate surface by using such a coating solution is called the spin-on-glass (SOG) method in which the hydrolyzate of the alkoxy silane compound forming the coating layer is subjected to a heat treatment to be converted into a silica-based coating layer over the whole surface of the substrate filling the recesses of the stepped level difference.

The alkoxy silane compound used for the preparation of the leveling solution for the SOG method in the prior art is exemplified by tetraalkoxy silanes such as tetraethoxy silane and monoalkyl trialkoxy silanes such as methyl triethoxy silane. The leveling coating solution prepared by the hydrolysis of these alkoxy silane compounds, however, is not quite satisfactory in order to meet the recent requirements for the extremely fine patterning work because the leveling effect exhibited by the silica-based coating film obtained from such a coating solution is relatively low and the largest thickness of the coating film, above which the coating film is susceptible to the formation of cracks, referred to as the crack-forming limit hereinafter, is relatively small. In addition, cracks are sometimes formed in the coating film by the oxygen plasma treatment along with a relatively large film thickness reduction caused thereby. These problems can be at least partly solved by undertaking an etch-back treatment though at a great sacrifice of the productivity.

In view of the above mentioned problems in the prior art relative to the leveling solutions, U.S. Pat. No. 5,496,402 proposes a leveling solution which is a solution of a co-hydrolyzate of triethoxy silane and tetraethoxy silane in a molar ratio of 1:9 to 9:1. Although the leveling solution proposed there is improved to some extent in respect of the leveling effect and resistance against crack formation without necessitating the etch-back treatment, no quite satisfactory results can be obtained with such a coating solution to meet the high-order requirements in the extremely fine patterning works for the very high degree of integration in the modern semiconductor devices.

The leveling solutions in the prior art for the formation of a silica-based coating film have further problems. For example, the hydrolyzate of the starting alkoxy silane compounds in the coating layer formed from the coating solution has remaining organic groups which by all means are converted into a gas by decomposition in the subsequent heat treatment of the coating layer on the substrate to decrease the adhesive bonding strength between the coating film and the substrate surface or the circuit pattern formed thereon in addition to the troubles by the corrosion of the metallic circuit wiring. In addition, evolution of the decomposition gas sometimes results in shrinkage of the coating film or formation of cracks therein to decrease the uniformity of the silica-based coating film. Accordingly, it is important to decrease remaining organic groups in the hydrolyzate of the alkoxy silane compounds.

On the other hand, the conventional coating solutions for a silica-based coating film in general have a defect that degradation in the quality of the coating solution by gelation takes place during storage of the solution after preparation due to subsequent proceeding of the hydrolysis reaction on the remaining alkoxy groups. As a remedy for this defect, Japanese Patent Kokai 4-216827 proposes a method by the use of a polymeric precursor for ceramic coating prepared by dissolving a trialkoxy silane in an organic solvent such as lower alcohols, ketones, esters and alkyleneglycols as well as diethyleneglycol dimethyl ether in a relatively high concentration and admixing the solution with water in a relatively small molar amount to the trialkoxy silane to effect hydrolysis of the trialkoxy silane.

The improvement in the stability of the coating solution in the above proposed method is obtained by limiting the amount of the water for the hydrolysis reaction so as to limit the extent of the hydrolysis of the alkoxy groups along with the use of a lower alcohol, such as ethyl, isopropyl and butyl alcohols, as the solvent. As a consequence of the limited degree of hydrolysis of the alkoxy groups, the coating solution prepared in this manner necessarily suffers a relatively high content of the remaining alkoxy groups resulting in an increase of the decomposition gas therefrom in the subsequent heat treatment with troubles mentioned above. The volume of gas evolution from the remaining alkoxy groups can of course be decreased by increasing the degree of hydrolysis of the alkoxy groups but this measure cannot be practically undertaken due to premature gelation pf the solution because of the use of a lower alcohol as the solvent.

SUMMARY OF THE INVENTION

The present invention, which has been completed as a result of the extensive investigations undertaken in order to overcome the above described problems in the prior art, accordingly has an object to provide a novel and improved coating solution having excellent storability for the formation of a silica-based coating film freed from the troubles in the heat treatment due to gas evolution so as to be capable of complying with the requirements in the very fine patterning works.

Thus, the coating solution provided by the invention for forming a silica-based coating film on a substrate surface is a uniform solution which comprises:

(A) a hydrolysis product of a trialkoxy silane compound as the solute; and (B) a solvent for dissolving the solute as the component (A) which is an alkyleneglycol dialkyl ether represented by the general formula

  (I)

in which each R is, independently from the other, an alkyl group having 1 to 4 carbon atoms and the subscript n is 3 or 4 or a solvent system comprising the alkyleneglycol dialkyl ether and an alcohol having 1 to 4 carbon atoms in a molecule, the amount of the alcohol being 10% by weight or smaller or, preferably, 3% by weight or smaller based on the total amount of the solution.

The above defined coating solution of the invention is prepared by the method which comprises the steps of:

(a) dissolving a trialkoxy silane compound, of which the alkoxy group has 1 to 4 carbon atoms, in an alkyleneglycol dialkyl ether represented by the general formula

  (I)

in which each R is, independently from the other, an alkyl group having 1 to 4 carbon atoms and the subscript n is 3 or 4, as a solvent in a concentration in the range from 1 to 5% by weight calculated as $SiO_2$ to give a silane solution;

(b) adding, to the silane solution, water in an amount in the range from 2.5 to 3.0 moles per mole of the trialkoxy silane compound;

(c) adding, to the silane solution, an acid in a catalytic amount as a catalyst for the hydrolysis of the trialkoxy silane compound;

(d) effecting hydrolysis of the trialkoxy silane compound to form a hydrolysis product thereof dissolved in the solvent containing an alcohol as a by-product of the hydrolysis reaction; and (e) removing, when the content of the alcohol in the solution exceeds 10% by weight or 3% by weight, the alcohol by distillation to such an extent that the content of the alcohol does not exceed 10% by weight or, preferably, 3% by weight of the solution.

DETAILED DESCRIPTION OF THE PREFERRED EMBODIMENTS

Figure 1:
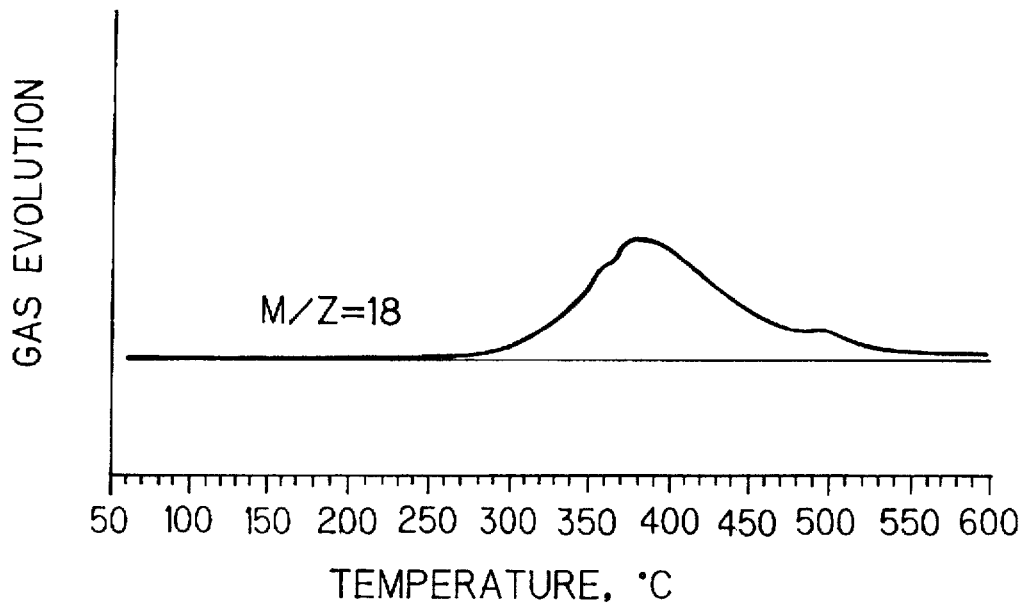
FIGS. 1 and 2 are each a graph showing the volume of gas evolution from the solid matter in the coating solutions prepared in Example 1 and Comparative Example 1 for the gaseous species having the mass-spectrometric M/Z indicated as the temperature was increased.

As is described above, the coating solution of the invention, which is prepared by the procedure described above, is a solution of a hydrolyzate of a trialkoxy silane compound in a specific organic solvent or solvent system defined above. This coating solution is advantageous in respect of the excellent storability without causing gelation to facilitate process control as well as in the absence of the troubles due to evolution of gases formed by the thermal decomposition in the course of curing to cause defects in the cured coating film formed from the coating solution so that the coating solution is very useful in the fine patterning works on a precision semiconductor device.

The alkoxy silane compound, from which a hydrolyzate is formed as the solute in the inventive coating solution, is a known compound having three alkoxy groups of 1 to 4 carbon atoms and a hydrogen atom each directly bonded to the silicon atom in the molecule. Examples of the trialkoxy silane compound include: trimethoxy silane, triethoxy silane, tripropoxy silane, tributoxy silane, diethoxy monomethoxy silane, monomethoxy dipropoxy silane, dibutoxy monomethoxy silane, methoxy ethoxy propoxy silane, monoethoxy dimethoxy silane, monoethoxy dipropoxy silane, butoxy ethoxy propoxy silane, dimethoxy monopropoxy silane, diethoxy monopropoxy silane, monobutoxy dimethoxy silane and the like, of which trimethoxy silane, triethoxy silane, tripropoxy silane and tributoxy silane are preferable and trimethoxy silane and triethoxy silane are more preferable.

In step (a) of the inventive method for the preparation of the coating solution, the above defined trialkoxy silane compound is dissolved in a specific organic solvent in a concentration in the range from 1 to 5% by weight or, preferably, in the range from 2 to 4% by weight calculated as $SiO_2$ to give a silane solution. When the concentration of the trialkoxy silane compound in the silane solution is too high, it is a possible trouble that gelation takes place in the solution during the hydrolysis reaction or during storage of the solution after hydrolysis of the trialkoxy silane compound. When the concentration of the trialkoxy silane compound in the silane solution is too low, it is a natural consequence that the concentration of the silane hydrolyzate in the solution after hydrolysis is so low that the solution cannot be used as such for the purpose of coating to effect leveling of a stepped substrate surface unless the solution is concentrated by the evaporation of a large volume of the solvent so that the concentration of the hydrolyzate is in the range from 1 to 15% by weight or, preferably, from 7 to 13% by weight calculated as $SiO_2$ suitable for coating to cause an economical disadvantage although the stability of the hydrolyzate solution is increased so much.

As to the organic solvent for dissolving the trialkoxy silane compound, it is a quite unexpected discovery that the desired improvements in the coating solution for the formation of a silica-based coating film can be achieved when the solvent is a specific alkyleneglycol dialkyl ether defined above. Namely, the alkyleneglycol dialkyl ether is represented by the above given general formula (I), in which the group denoted by R is an alkyl group having 1 to 4 carbon atoms, including methyl, ethyl, propyl and butyl groups, and the subscript n is 3 or 4. Examples of such a solvent compound include: propyleneglycol dimethyl ether, propyleneglycol diethyl ether, propyleneglycol dipropyl ether, propyleneglycol dibutyl ether, butyleneglycol dimethyl ether, butyleneglycol diethyl ether, butyleneglycol dipropyl ether and butyleneglycol dibutyl ether, of which propyleneglycol dimethyl ether, referred to as PGDM hereinafter, is preferred, although these solvents can be used as a mixture of two kinds or more according to need. It is an unexpected discovery that the storage stability of the coating solution prepared by using PGDM as the solvent is superior to that prepared by using an ethyleneglycol dialkyl ether if not to mention the advantage in respect of the lower toxicity of PGDM against human body than the corresponding ethyleneglycol derivatives.

The thus prepared silane solution is admixed with water as a reactant in the hydrolysis reaction of the trialkoxy silane compound although it is optional that the trialkoxy silane compound is dissolved in the organic solvent already containing water. The amount of the water added to the silane solution is very critical and should be in the range from 2.5 to 3.0 moles or, preferably, from 2.8 to 3.0 moles of water per mole of the trialkoxy silane compound in the silane solution. When the amount of water is too small, the hydrolysis reaction of the trialkoxy silane compound can hardly proceed to completeness leaving a substantial amount of the unhydrolyzed alkoxy groups resulting in an increase in the content of volatile matters in the coating film on the substrate surface to be vaporized as a decomposition gas in the course of curing of the hydrolyzate. When the amount of water is too large, the resultant solution of the hydrolyzate would suffer a decrease in the storage stability to cause premature gelation.

The silane solution admixed with water is further admixed with an acid as a catalyst to promote the hydrolysis reaction of the trialkoxy silane compound. The acid can be an organic acid or inorganic acid. Examples of suitable acids include acetic acid, propionic acid and butyric acid as the examples of the organic acid and hydrochloric acid, nitric acid, sulfuric acid and phosphoric acid as the examples of the inorganic acid, of which nitric acid is preferred in respect of the catalytic activity for the hydrolysis reaction and the volatilizability to be dissipated in the process of curing. The amount of the acid catalyst in the reaction mixture is a catalytic amount in the range from 0.1 to 500 ppm by weight or, preferably, in the range from 0.1 to 100 ppm by weight based on the overall amount of the solution. It is a preferable procedure that an aqueous solution of the acid or acidified water is prepared separately and the acidified water is gradually added dropwise to the solution of the trialkoxy silane compound in an alkyleneglycol dialkyl ether.

The hydrolysis reaction of the trialkoxy silane in the thus prepared silane solution can proceed even at room temperature but it is advantageous to heat the solution at a temperature not higher than 70° C. to accelerate the reaction. The hydrolysis reaction is complete usually within 5 to 100 hours depending on the reaction temperature and other factors. The thus obtained solution contains the hydrolyzate of the trialkoxy silane compound and the solvent thereof is a mixture of the alkyleneglycol dialkyl ether and the alcohol having 1 to 4 carbon atoms in a molecule which is a by-product formed by the hydrolysis of the alkoxy groups in the trialkoxy silane compound.

The content of the alcohol as the hydrolysis product in the solvent system consisting of the alkyleneglycol dialkyl ether and the alcohol and dissolving the hydrolyzate of the trialkoxy silane compound naturally depends on the concentration of the trialkoxy silane compound in the silane solution subjected to the hydrolysis reaction. It is important that the concentration of the alcohol should be as low as possible and should not exceed 10% by weight or, preferably, 8% by weight or, more preferably, 3% by weight based on the total amount of the inventive coating solution in order to ensure high quality of the silica-based coating film formed from the coating solution so that the reaction mixture after completion of the hydrolysis reaction is usually subjected to a treatment for the selective removal of the alcohol from the solution. The use of the specified alkylene-glycol dialkyl ether as the solvent is advantageous also in this regard due to the large difference in the boiling points between the alkyleneglycol dialkyl ether and the alcohol formed by the hydrolysis reaction which is, in the preferred cases, methyl or ethyl alcohol. Though not well understood, it is presumable that, when the coating solution contains a lower alcohol in a substantial concentration, the silicon-bonded hydrogen atoms in the hydrolyzate of the trialkoxy silane compound react with the alcohol molecules to form silicon-bonded alkoxy groups with formation of hydrogen gas to cause a decrease in the crack-forming limit and other troubles. The treatment of the selective removal of the alcohol from the solution can be performed by distillation under reduced pressure of 30 to 300 mmHg or, preferably, 50 to 200 mmHg at a temperature of 20° to 50° C. taking 2 to 6 hours. If necessary, removal of the alcohol by distillation is followed by the removal of the alkyleneglycol dialkyl ether with an object to bring the concentration of the alkoxy silane hydrolyzate into 1 to 15% by weight or, preferably, 7 to 13% by weight calculated as $SiO_2$ suitable for the coating works depending on the particularly intended application of the coating solution.

Characteristically, the trialkoxy silane hydrolyzate contained in the thus prepared inventive coating solution and isolated from the solvent exhibits a very unique thermogravimetric behavior when the thermogravimetric analysis is undertaken in air. Namely, the thermogravimetric curve taken by increasing the temperature indicates an increase of several % at a temperature above 300° C. in great contrast to a conventional coating solution containing a trialkoxy silane hydrolyzate which indicates a weight decrease in the thermogravimetric analysis. Further, the trialkoxy silane hydrolyzate contained in the inventive coating solution is also characterized by the unique infrared absorption spectrum having no absorption band at a peak wave number of about 3000 $cm^{-1}$ assignable to silicon-bonded alkoxy groups while the hydrolyzate contained in conventional coating solution of the similar type usually has an infrared absorption band at the same wave number range.

In the following, the inventive coating solution and the inventive method for the preparation thereof are described in more detail by way of Examples.

Example 1

A silane solution was prepared by dissolving 73.9 g (0.45 mole) of triethoxy silane in 799.0 g (7.68 moles) of propyleneglycol dimethyl ether under agitation. The concentration of the silane compound in the solution was 3% by weight calculated as $SiO_2$. Into the thus prepared silane solution were gradually added 24.2 g (1.34 moles) of deionized water containing nitric acid in a concentration of 5 ppm by weight dropwise under agitation followed by further continued agitation of the solution for about 3 hours and standing of the mixture as such at room temperature for 6 days.

The thus obtained solution contained 8.3% by weight of ethyl alcohol as the hydrolysis product of the triethoxy silane. The solution was subjected to distillation at 40° C. under a pressure of 120 to 140 mmHg taking 1 hour to evaporate the solvents so that the thus concentrated solution contained 8% by weight of the hydrolyzate of triethoxy silane as the non-volatile matter and 1% by weight of ethyl alcohol.

The above prepared coating solution, referred to as the Solution 1 hereinafter, was stored at room temperature to determine the storage stability in days until gelation of the solution took place to find that the solution could be stored at least 90 days.

Comparative Example 1

A silane solution was prepared by dissolving 129.6 g (0.79 mole) of triethoxy silane and 60.1 g (0.40 mole) of tetramethoxy silane in 662.7 g (7.36 moles) of ethyleneglycol dimethyl ether under agitation. The total concentration of the silane compounds in the solution was 8.0% by weight calculated as $SiO_2$. Into the thus prepared silane solution were gradually added 35.6 g (2.0 moles) of deionized water containing nitric acid in a concentration of 333 ppm by weight dropwise under agitation followed by further continued agitation of the reaction mixture for about 3 hours and standing of the mixture as such at room temperature for 5 days.

The thus obtained solution contained 21.1% by weight of ethyl and methyl alcohols as the hydrolysis product of the silane compounds. The solution was subjected to distillation at 40° C. under a pressure of 120 to 140 mmHg taking 1 hour to evaporate the solvents so that the thus concentrated solution contained 8% by weight of non-volatile matters and 8% by weight of the alcohols. The storability of the thus obtained coating solution, referred to as the Solution 2 hereinafter, was at least 120 days.

Comparative Example 2

A silane solution was prepared by dissolving 73.9 g (0.45 mole) of triethoxy silane in 310.9 g (3.45 moles) of ethyleneglycol dimethyl ether under agitation. The concentration of the silane compound in the solution was 6.6% by weight calculated as $SiO_2$. Into the thus prepared silane solution were gradually added 24.2 g (1.34 moles) of deionized water containing nitric acid in a concentration of 5 ppm by weight dropwise under agitation followed by further continued agitation of the reaction mixture for about 3 hours and standing of the mixture as such at room temperature for 3 days.

The thus obtained solution contained 15.2% by weight of ethyl alcohol as the hydrolysis product of the silane compound. The solution was subjected to distillation at 40° C. under a pressure of 120 to 140 mmHg taking 1 hour to evaporate the solvents so that the thus concentrated solution contained 8% by weight of non-volatile matters and 8% by weight of ethyl alcohol. The storability of the thus obtained coating solution, referred to as the Solution 3 hereinafter, was 30 days.

Comparative Example 3

A silane solution was prepared by dissolving 73.9 g (0.45 mole) of triethoxy silane in 323 g (3.58 moles) of ethyleneglycol dimethyl ether under agitation. The concentration of the silane compound in the solution was 6.6% by weight calculated as $SiO_2$. Into the thus prepared silane solution were gradually added 12.1 g (0.67 mole) of deionized water containing nitric acid in a concentration of 5 ppm by weight dropwise under agitation followed by further continued agitation of the reaction mixture for about 3 hours and standing of the mixture as such at room temperature for 5 days.

The thus obtained solution contained 8.1% by weight of ethyl alcohol as the hydrolysis product of the silane compound. The solution was subjected to distillation at 40° C. under a pressure of 120 to 140 mmHg taking 1 hour to evaporate the solvents so that the thus concentrated solution contained 8% by weight of non-volatile matters and 7% by weight of ethyl alcohol. The storability of the thus obtained coating solution, referred to as the Solution 4 hereinafter, was 50 days.

Comparative Example 4

A silane solution was prepared by dissolving 73.9 g (0.45 mole) of triethoxy silane in 799.0 g (17.8 moles) of ethyl alcohol under agitation. The concentration of the silane compound in the solution was 3% by weight calculated as $SiO_2$. Into the thus prepared silane solution were gradually added 24.2 g (1.34 moles) of deionized water containing nitric acid in a concentration of 5 ppm by weight dropwise under agitation followed by further continued agitation of the reaction mixture for about 3 hours and standing of the mixture as such at room temperature for 6 days.

The thus obtained solution was subjected to distillation at 40° C. under a pressure of 120 to 140 mmHg taking 1 hour to evaporate th solvents. The thus concentrated solution contained 8% by weight of non-volatile matters. The storability of the thus obtained coating solution, referred to as the Solution 5 hereinafter, was 5 days.

Comparative Example 5

A silane solution was prepared by dissolving 73.9 g (0.45 mole) of triethoxy silane in 239.4 g (2.66 moles) of ethyleneglycol dimethyl ether under agitation. The concentration of the silane compound in the solution was 8% by weight calculated as $SiO_2$. Into the thus prepared silane solution were gradually added 24.2 g (1.34 moles) of deionized water containing nitric acid in a concentration of 5 ppm by weight dropwise under agitation followed by further continued agitation of the reaction mixture for about 3 hours and standing of the mixture as such at room temperature for 3 days.

The thus obtained solution contained 8.0% by weight of non-volatile matters and 18% by weight of ethyl alcohol as the hydrolysis product of the silane compound. The storability of the thus obtained coating solution, referred to as the Solution 6 hereinafter, was 13 days.

Comparative Example 6

A silane solution was prepared by dissolving 73.9 g (0.45 mole) of triethoxy silane in 799.0 g (8.87 moles) of ethyleneglycol methyl ether under agitation. The concentration of the silane compound in the solution was 3% by weight calculated as $SiO_2$. Into the thus prepared silane solution were gradually added 24.2 g (1.34 moles) of deionized water containing nitric acid in a concentration of 5 ppm by weight dropwise under agitation followed by further continued agitation of the reaction mixture for about 3 hours and standing of the mixture as such at room temperature for 6 days.

The thus obtained solution contained 8.3% by weight of ethyl alcohol as the hydrolysis product of the silane compound. The solution was subjected to distillation at 40° C. under a pressure of 120 to 140 mmHg taking 1 hour to evaporate the solvents so that the thus concentrated solution contained 8% by weight of non-volatile matters and 3% by weight of ethyl alcohol. The storability of the thus obtained coating solution, referred to as the Solution 7 hereinafter, was at least 60 days.

Application Example 1

Each of the Solutions 1 to 7 as prepared in Example 1 and Comparative Examples 1 to 6 was applied on a spin coater rotating at 2000 rpm for 10 seconds onto the surface of a 4-inch silicon wafer having a stepwise level difference of 1 μm height with an aluminum layer to form a coating layer. The thus coated silicon wafer was heated first at 80° C. for 1 minute, then at 150° C. for 1 minute and finally at 200° C. for 1 minute each time on a hot plate of the respective temperature followed by baking in air at 400° C. for 30 minutes to give a silica-based coating film. The above described procedure of spin coating with the coating solution and drying and baking of the coated silicon wafer was repeated twice (with Solutions 1 and 2) or 3 times (with the other Solutions) so that the overall thickness of the thus formed silica-based coating film was as indicated in Table 1 below on the flat area of the surface apart from the stepped level difference. As examined with a scanning electron microscope for the condition of surface leveling and occurrence of cracks, the leveling condition was good in each of the experiments and the results of the inspection for the occurrence of cracks in the coating films were as shown in Table 1 below.

Application Example 2

Each of the Solutions 1 to 7 as prepared in Example 1 and Comparative Examples 1 to 6 was applied on a spin coater rotating at 4000 rpm for 10 seconds onto the surface of a 4-inch silicon wafer and the thus coated silicon wafer was heated first at 80° C. for 1 minute, then at 150° C. for 1 minute and finally at 200° C. for 1 minute each time on a hot plate of the respective temperature. The thus dried coating films had a thickness indicated in Table 1 below as the initial film thickness. Thereafter, the silicon wafer was baked in air at 400° C. for 30 minutes to convert the coating film into a silica-based coating film having a thickness indicated in Table 1 as the final film thickness. The value of "shrinkage" given in Table 1 is a percentage calculated by the following equation:

Shrinkage, $\% = (T_1 - T_2)/T_1 \times 100$, in which $T_1$ is the initial film thickness and $T_2$ is the final film thickness after baking.

With an object to check the denseness of the silica-based coating film formed on the silicon surface, each silicon wafer was immersed in a 0.1% aqueous solution of hydrogen fluoride at 25° C. for 5 minutes and the decrease in the thickness of the coating film was determined to give the results shown in Table 1 as the "etching rate" in nm/minute.

TABLE 1

| Solution | Application Example 1 | | Application Example 2 | | | |
|---|---|---|---|---|---|---|
| | Thickness on flat area, μm | Cracks | Film thickness | | Shrinkage, % | Etching rate, nm/minute |
| | | | initial, nm | final, nm | | |
| 1 | 750 | No | 280.1 | 256.6 | 8.4 | 7.1 |
| 2 | 490 | Yes | 228.3 | 196.9 | 13.8 | 19.0 |
| 3 | 730 | No | 208.0 | 190.5 | 8.4 | 6.9 |
| 4 | 730 | Yes | 237.2 | 208.7 | 12.0 | 14.7 |
| 5 | 710 | No | 223.3 | 204.7 | 8.3 | 7.5 |
| 6 | 730 | No | 233.6 | 213.2 | 8.7 | 7.1 |
| 7 | 730 | No | 194.3 | 178.0 | 8.4 | 6.8 |

Application Example 3

A silicon wafer was coated with the Solution 1 or 2 on a spin coater rotating at 2000 rpm for 10 seconds followed by heating for drying first at 80° C. for 1 minute, then at 150° C. for 1 minute and finally at 200° C. for 1 minute and baking at 400° C. for 30 minutes in an atmosphere of nitrogen to form a silica-based coating film having a thickness of 420 nm.

Figure 2:
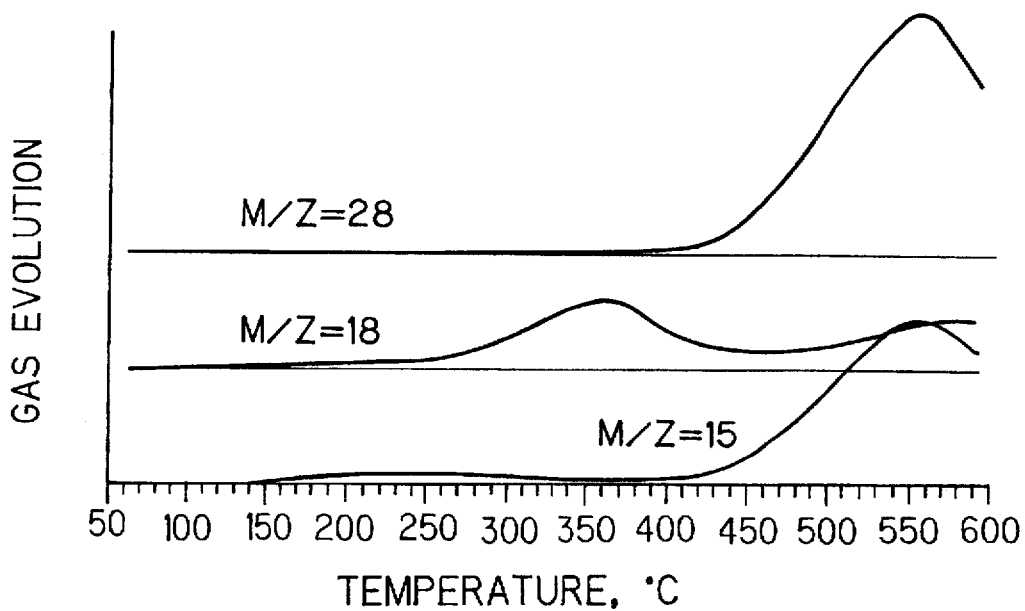

Each of the thus formed coating films was subjected to the test of gas evolution by thermal decomposition using a gas evolution tester (Model EMD-WA 1000, manufactured by Denshi Kagaku Co.) by increasing the temperature from 50 to 600° C. The results for the Solutions 1 and 2 are shown in FIGS. 1 and 2, respectively, in which each of the curves the gas evolution for the gaseous species having the mass-spectrometric M/Z indicated on the curve, the base line of each curve corresponding to zero evolution. The M/Z values of 15, 18 and 28 could be assumed to correspond to the gaseous species of $CH_3$, $H_2O$ and $C_2H_4$ or CO, respectively.

As is understood from these figures, the gaseous species evolved from the inventive Solution 1 was $H_2O$ alone while the gaseous species evolved from the comparative Solution 2 included carbon-containing species. These results could explain the improvements obtained with the inventive coating solutions relative to corrosion of metallic circuit layers, small shrinkage of the coating film and absence of crack formation.

Application Example 4

Following the procedure described in Example 9 of Japanese Patent Kokai 4-216827, a coating solution, referred to as the Solution 8 hereinafter, was prepared by the addition of 0.33 g (0.018 mole) of deionized water to a silane solution consisting of 4.0 g (0.024 mole) of triethoxy silane, 12.2 g of isopropyl alcohol, 4.0 g of n-butyl alcohol and a drop of 5% hydrochloric acid and heating the solution under agitation for 30 minutes at 60° to 75° C. followed by cooling.

Figure 3:
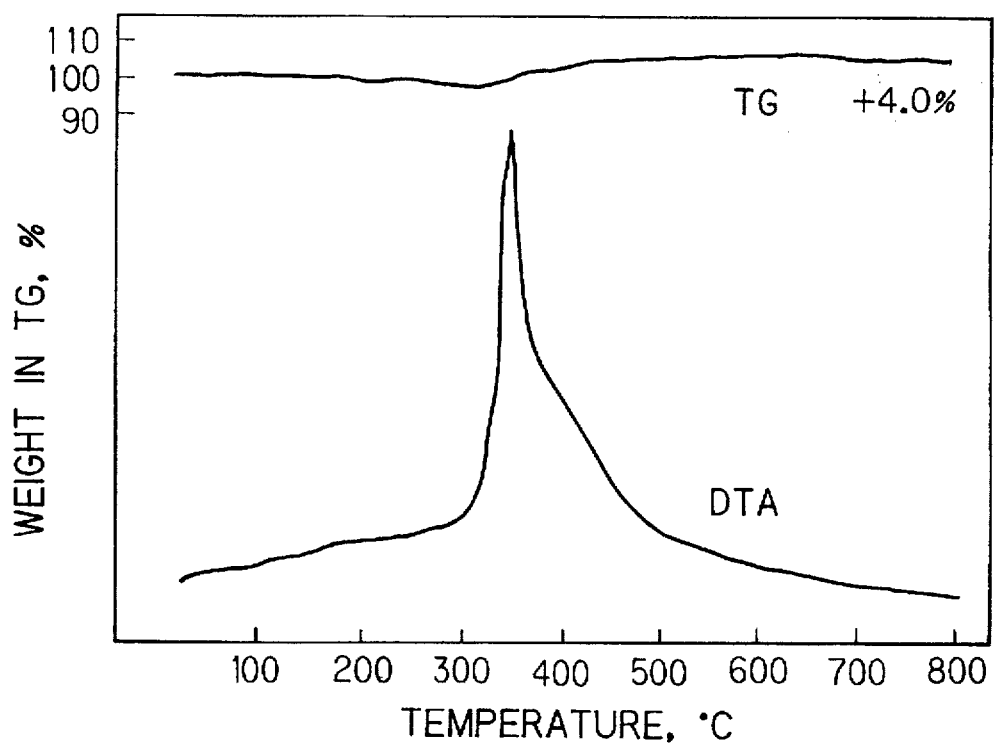
FIGS. 3 and 4 each shows the DTA and TG curves of the solid material obtained from the inventive coating solution and conventional coating solution, respectively.
Figure 4:
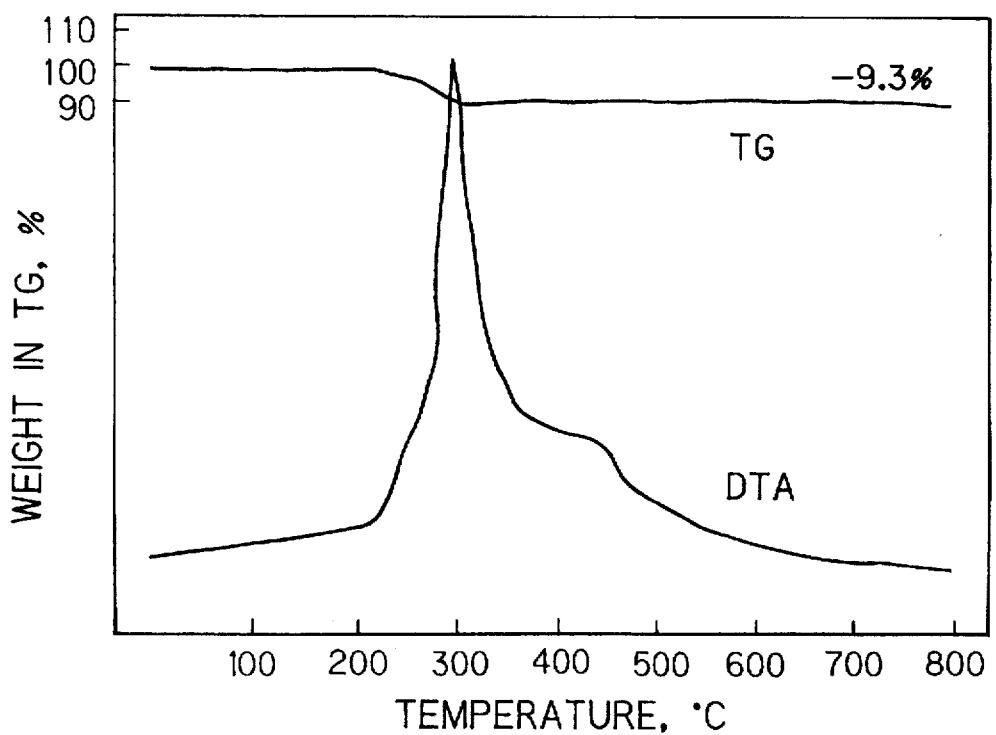

A small portion of each of the Solutions 1 and 8 was heated at 140° C. for 60 minutes to evaporate the solvents to dryness. The solid residue was subjected to the thermogravimetric analysis (TG) and differential thermal analysis (DTA) in the temperature range of 40° to 800° C. at a temperature elevation rate of 10° C./minute to give the results shown in FIGS. 3 and 4 for the Solutions 1 and 8, respectively. As is indicated on the TG curve, the solid material obtained from the Solution 1 indicated a weight increase of about 4.0% at 360° C. or higher up to 800° C. while the solid material obtained from the Solution 8 indicated a weight decrease of 9.3% when heated up to 800° C. These results suggested that the degree of hydrolysis of the trialkoxy silane compound was high in the Solution 1, as compared with the Solution 8, without leaving any significant amount of the unhydrolyzed alkoxy groups to be lost by thermal decomposition while the silicon-bonded hydrogen atoms are oxidized to form siloxane linkages with a weight increase. In contrast thereto, the degree of hydrolysis of the trialkoxy silane was low in the Solution 8 leaving a large amount of unhydrolyzed alkoxy groups which were lost by thermal decomposition to cause a weight decrease.

Application Example 5

Figure 5:
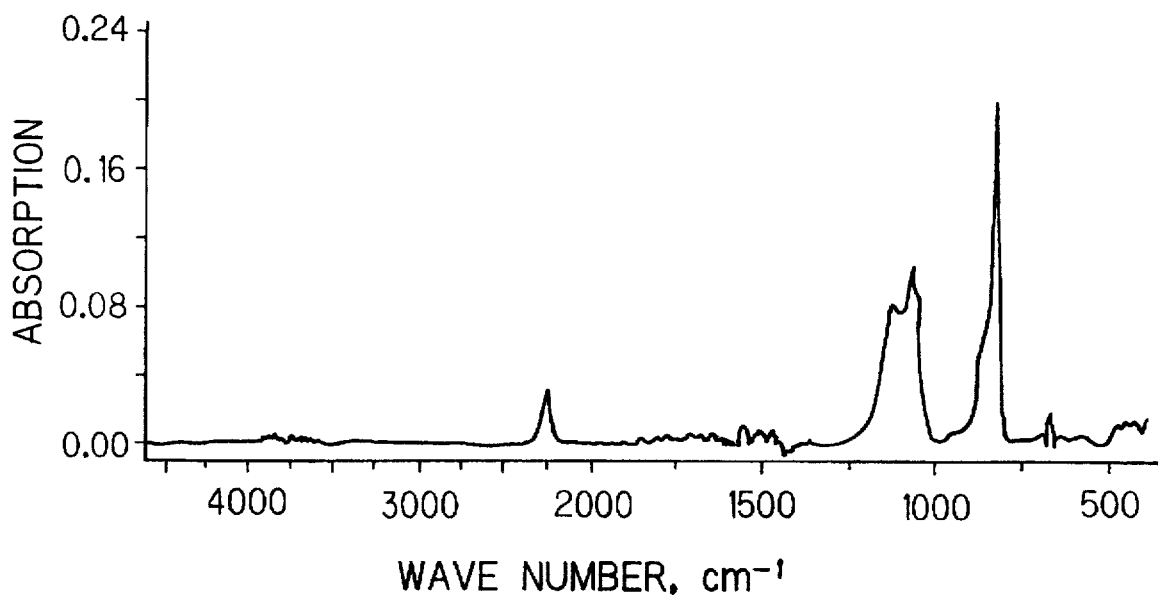
FIGS. 5 and 6 are each an infrared absorption spectrum of the coating film obtained from the inventive coating solution and conventional coating solution, respectively.
Figure 6:
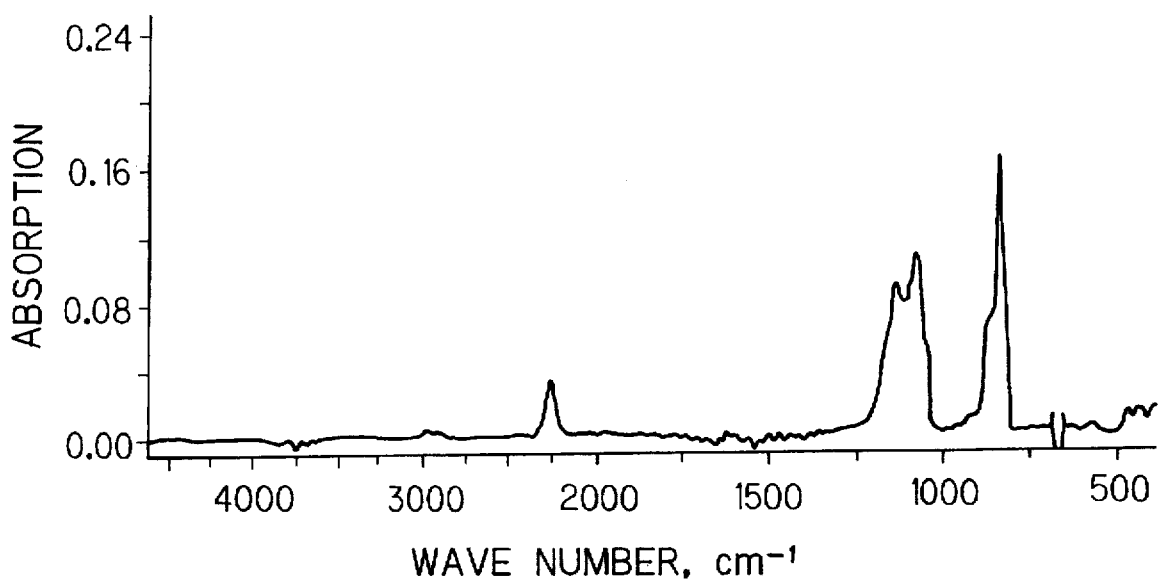

A 4-inch silicon wafer was coated with the Solution 1 or 8 and the coating layer was dried by heating at 140° C. for 30 minutes to form a dried coating film of 200 nm thickness. The infrared absorption spectra of these coating films from the Solutions 1 and 8 are shown in FIGS. 5 and 6, respectively.

As is clear by making comparison of these spectra, the spectrum of the Solution 1 had no absorption band at about 3000 cm$^{-1}$ found in the spectrum of the Solution 8, which could be assigned to the stretching vibration of the C-H bond indicating presence of a substantial amount of the unhydrolyzed alkoxy groups.

What is claimed is:

1. A coating solution for the formation of a silica-based coating film on a substrate surface which consists essentially of, as a uniform solution:
   (A) a hydrolysis product of a trialkoxy silane compound as the solute of the solution; and
   (B) a solvent for dissolving the solute as the component (A) which is an alkyleneglycol dialkyl ether represented by the general formula $$RO-(CH_2)_n-OR,$$

in which each R is, independently from the other, an alkyl group having 1 to 4 carbon atoms and the subscript n is 3 or 4 or a mixture comprising the alkyleneglycol dialkyl ether and an alcohol having 1 to 4 carbon atoms in a molecule, the amount of the alcohol in the mixture being 10% by weight or smaller based on the total amount of the solution.

2. The coating solution as claimed in claim 1 in which the amount of the alcohol in the solution does not exceed 8% by weight based on the total amount of the solution.

3. The coating solution as claimed in claim 2 in which the amount of the alcohol in the solution does not exceed 3% by weight based on the total amount of the solution.

4. The coating solution as claimed in claim 1 in which the alkyleneglycol dialkyl ether is propyleneglycol dimethyl ether.

5. The coating solution as claimed in claim 1 in which the trialkoxy silane is selected from the group consisting of trimethoxy silane, triethoxy silane, tripropoxy silane and tributoxy silane.

6. The coating solution as claimed in claim 5 in which the trialkoxy silane is triethoxy silane.

7. The coating solution as claimed in claim 1 in which the concentration of the hydrolyzate of the trialkoxy silane in the solution is in the range from 7 to 13% by weight calculated as $SiO_2$.

* * * * *